United States Patent [19]
Park

[11] Patent Number: 5,349,867
[45] Date of Patent: Sep. 27, 1994

[54] SENSITIVE RESISTIVE PRESSURE TRANSDUCER

[75] Inventor: Kyong M. Park, Thousand Oaks, Calif.

[73] Assignee: Kavlico Corporation, Moorpark, Calif.

[21] Appl. No.: 72,763

[22] Filed: Jun. 3, 1993

Related U.S. Application Data

[63] Continuation-in-part of Ser. No. 801,526, Dec. 2, 1991.

[51] Int. Cl.$^5$ ............................ G01L 7/08; G01L 9/06
[52] U.S. Cl. ........................................ 73/727; 29/621.1; 73/721; 338/4
[58] Field of Search .................. 73/720, 721, 726, 727, 73/708; 338/4, 42; 29/621.1

[56] References Cited

U.S. PATENT DOCUMENTS

| | | | |
|---|---|---|---|
| 3,325,762 | 6/1967 | McLellan | 338/4 |
| 3,341,794 | 9/1967 | Stedman | 338/4 |
| 4,726,232 | 2/1988 | Koneval | 73/721 |
| 4,735,098 | 4/1988 | Kavli et al. | 73/718 |
| 4,770,045 | 9/1988 | Nakagawa et al. | 73/726 |
| 4,821,011 | 4/1989 | Kotaki et al. | 338/4 |
| 4,852,581 | 8/1989 | Frank | 128/672 |
| 4,932,265 | 6/1990 | Skuratovsky et al. | 73/727 |
| 4,939,497 | 7/1990 | Nishida et al. | 73/721 |
| 5,020,377 | 6/1991 | Park | 73/718 |

*Primary Examiner*—Donald Woodiel
*Attorney, Agent, or Firm*—Poms, Smith, Lande & Rose

[57] ABSTRACT

A resistive pressure transducer wherein a flexible diaphragm is mounted in a spaced apart relationship to the upper surface of a base member. A conductive path is deposited on one surface of the diaphragm. A resistive configuration is also deposited on the same surface of the diaphragm. The resistive configuration includes four separate resistive patterns. The first and third resistive patterns are deposited in close proximity to the outer edge of the diaphragm. The first and third resistive patterns are each comprised of three radially extending resistors, spaced apart along the periphery of the diaphragm, and interconnected by conductive material. The second and fourth resistive patterns are deposited in close proximity to the center of the diaphragm. The first and third resistive patterns measure radial strain, while the second and fourth resistive patterns measure tangential strain. The four resistive patterns each forms a separate leg of a Wheatstone bridge configuration.

23 Claims, 2 Drawing Sheets

SENSITIVE RESISTIVE PRESSURE TRANSDUCER

This is a continuation-in-part application of Ser. No. 07/801,526, filed Dec. 2, 1991.

I. Field of Invention

The present invention relates to resistive pressure transducers, and more particularly to resistive pressure transducers utilizing diaphragms having radially and tangentially oriented resistive patterns deposited on the surface of the diaphragm.

II. Background of Invention

Pressure transducers using flat diaphragms with strain gauges to measure pressure induced deflections are known in the art of pressure transducers. For example, F. Kavli and K. Park, U.S. Pat. No. 4,735,098, issued on Apr. 5, 1988, and assigned to the assignee of the present application, discloses a pressure transducer having a diaphragm mounted in spaced apart relationship to a base member, with resistive material bonded to an inner surface of the diaphragm, such that the resistance varies as the diaphragm deflects under pressure.

It is also known in the art to place the resistive material in such a location so as to measure tensile tangential strain at the center of the diaphragm and compressive radial strain at the outer edge of the diaphragm. In order to obtain high resistance values, it is preferable that the resistors have large area. As a result, pressure transducers having long, narrow resistors with large area were designed. For example, E. Skuratovsky, U.S. Pat. No. 4,932,265 issued on Jun. 12, 1990, discloses a pressure transducer having long narrow resistors deposited on a diaphragm.

In order to accommodate the long and narrow resistors, larger diaphragms were required. However, as the diaphragm size becomes larger, the stresses in the diaphragm increase as a function of the square of the radius. Therefore, large diaphragms have undesirable high stresses, as well as low strength.

To solve this problem with the prior art, curved resistive patterns were utilized. Curved resistive patterns are desirable in that the curved pattern allows for a large area resistor that fits within a diaphragm with a relatively small diameter. For example, Skuratovsky discloses a pressure transducer having C-shaped annular resistors mounted on the diaphragm. The C-shaped resistor provided the desirable large area within a relatively small diameter.

However, in the prior art resistive configurations, the radial location and configuration of the resistors caused the resistors to pick up undesirable stress effects. More specifically, the resistors located at the outer edge of the diaphragm tended to pick up the tangential components, as well as the radial components of the strain. Therefore, a need existed for a high output resistive pressure transducer with a resistive configuration having large area resistors located near the outer edge of the diaphragm, yet at a radial distance and of a configuration such that the tangential stress effects on the resistors are minimized and the radial stress effects are enhanced, and further having large area resistor located near the center of the diaphragm, but at a radial distance so as the radial strain effects on the resistors are minimized.

SUMMARY OF INVENTION

One object of the present invention is to provide a resistive pressure transducer utilizing tangentially oriented resistive patterns deposited near the center of the diaphragm and radially oriented resistive patterns deposited near the outer edge of the diaphragm.

A further object of this invention is to provide a resistive pressure transducer wherein the tangential stress effects on the radially oriented resistive patterns are minimized.

Another object of this invention is to provide a resistive pressure transducer having a resistive configuration wherein the radial location of the resistors is selected such that the sensitivity and gain of the transducer is maximized.

Yet another object of the present invention is to provide a resistive pressure transducer wherein the resistors have broad area.

A still further object of the invention is to provide a resistive pressure transducer that accommodates a diaphragm with a relatively small diameter.

These and other objects of the present invention are achieved through a resistive pressure transducer for measuring pressure comprising a substrate having an upper surface and a lower surface, a flexible diaphragm mounted in a spaced apart relationship to the upper surface of the substrate, a conductive path deposited on a first surface of the diaphragm, and a resistive configuration deposited on the first surface of the diaphragm. The resistive configuration is preferably comprised of four resistive patterns. The first and third resistive patterns are deposited in close proximity to the outer diameter of the diaphragm in order to measure the radial effects of the stress. The first and third resistive patterns are each comprised of three resistors spaced apart along the circumference of the disk and interconnected by the conductive material. The second and fourth resistive patterns are deposited in close proximity to the center of the diaphragm. The four resistive patterns are coupled in a Wheatstone bridge configuration such that the adjacent legs of the bridge detect strains of different signs.

In accordance with a broader aspect of the invention, a resistive pressure transducer is also disclosed wherein a flexible diaphragm is mounted in a spaced apart relationship to a substrate. A resistive pattern is deposited on one surface of the diaphragm. The resistive patterns comprises a first resistive pattern deposited in close proximity to the outer edge of the diaphragm, and includes a plurality of substantially radially extending resistive segments, with alternate ends of successive segments being interconnected by conductive material, and a second resistive pattern deposited in close proximity to the center of the diaphragm. The transducer further includes means for coupling the resistive patterns to sense the differences in resistance of the resistive patterns as the diaphragm flexes. In a preferred embodiment, the resistive pattern material has a resistivity over 100 times the resistivity of the conductive material.

These and other objects of the present invention will now become apparent from a review of the drawings and the following description of the preferred embodiments.

DETAILED DESCRIPTION

Figure 1:
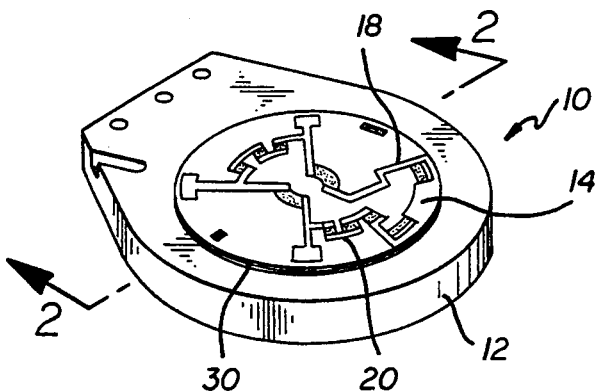
FIG. 1 is a perspective view of a resistive pressure transducer illustrating the principles of this invention.
Figure 2:
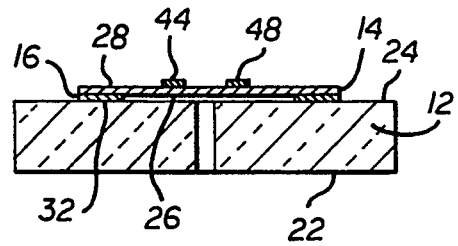
FIG. 2 is a front sectional view of the resistive pressure transducer taken along line 2—2 of FIG. 1.

Referring now to FIGS. 1 and 2, a pressure resistive transducer 10 of the present invention is shown. The transducer 10 is generally comprised of a base plate 12, a diaphragm 14, means 16 for mounting the diaphragm to the base plate in a spaced apart relationship, a layer of conductive material 18 deposited in a pre-determined pattern on the diaphragm 14, and a resistive configuration 20 deposited on predetermined areas of the diaphragm 14, and engaging the conductive material 18. More specifically, the base plate 12 has a substantially planar lower surface 22 and a substantially planar upper surface 24. The diaphragm 14 also includes a substantially planar lower surface 26 and a substantially planar upper surface 28. The diaphragm 14 is mounted to the base plate upper surface 24 by the process of silk screening palladium silver along an outer perimeter 30 of the diaphragm lower surface 26 and compressing the diaphragm 14 to the base plate upper surface 24. The palladium silver therefore forms a seal 32 along the diaphragm outer perimeter 30, which maintains the diaphragm 14 in a spaced apart relationship from the base plate 12. Alternatively, another type of suitable screen epoxy may be used to seal the diaphragm 14 to the base plate 12 in a spaced apart relationship.

In the present invention, the electrical components disposed on the diaphragm 14 include both conductive material and resistive material. The resistive material has a resistivity preferably one hundred times greater than the resistivity of the conductive material. In empirical tests, conductive materials have a resistivity of less than 1 ohm per unit area, while resistivity of the resistive materials range in the 10 kilo-ohm per unit area, on one-mil thick specimens. The present invention thus utilizes both conductive material and resistive material while prior art transducers use what can be characterized as resistive material only.

The present invention has advantages over prior art transducers. For example, using only semi-conductive material to form the pattern on the diaphragm as in conventional transducers limits the pattern design and makes for an inefficient design. The reason is that the semi-conductive material must be of a certain thickness and width so that the current carrying cross-section is adequate for conduction. By comparison, the present invention uses conductors that have very low resistivity and can be fabricated into a greater variety of cross-sectional configurations without concern for limiting current flow. Current carrying capacity of the present invention conductors is therefore not a problem during engineering design as is the case in many prior art applications.

In addition, when all of the electrical components on the diaphragm are made of a single material as in conventional transducers, detection of deflection is complicated and is inefficient because of the broad areas of semi-conductive material needed to provide high conductivity connections. In accordance with the present invention, however, higher efficiency is achieved because the resistance zones are only located in the inner and outer areas where high (and different) stresses are present, and conductors are employed to interconnect these resistive areas. Using conductive leads for interconnection improves efficiency and transducer sensitivity by freeing up areas for the sensing resistive materials which are located at the positions where stress and strain should be measured. Isolation of the detection components that measure the stress or strain is much improved in the present invention over the prior art. The present invention is thus a precision instrument that accurately measures stress or strain at particular locations on the diaphragm.

In a preferred embodiment of the present invention, the resistive material is a paste made from DuPont ® 1641, which exhibits a resistivity of about 10 kilo-ohms, or thousands of ohms, per square, or per unit area. Incidentally, when the resistivity of a resistive or conductive coating is to be referenced, it is useful to refer to the resistivity across from one side of a square area of the coating to the other side of the square, as this resistivity is constant, notwithstanding changes in the dimension of the square. For various applications, a resistivity ranging from five to seven kilo-ohms per unit area can be attained by mixing two parts DuPont ® 1641 with one part DuPont ® 1631. The resistive materials are understood to be an alloy of manganese, tungsten and carbon.

In the preferred embodiment, the conductive material is a paste made from DuPont ® 7474, which exhibits a resistivity of only 0.1 ohms per unit area. This low resistivity material is highly suitable as a conductor, because it is an alloy with a high percentage of silver.

The base plate 12 is preferably formed of 96% alumina. The base plate 12 is also preferably constructed of the same material as the diaphragm 14 such that the temperature expansion rates of the base plate 12 and the diaphragm 14 are similar. Therefore, changes in temperature will not result in undesirable stresses in the diaphragm 14 caused by the difference in expansion rates between the base plate 12 and the diaphragm 14. It is further noted that, with the base plate 12 and the diaphragm 14 being formed of ceramic, such as aluminum oxide, the material 16 may be a glass frit formed of two types of glass particles, screened onto the base plate, and fired to mount and space the diaphragm relative to the base plate.

In the preferred embodiment, the diaphragm 14 is coated with a polymer coating. The polymer coating prevents undesirable shorting of the circuit when a pressure media is applied to the resistive configuration 20.

Figure 6:
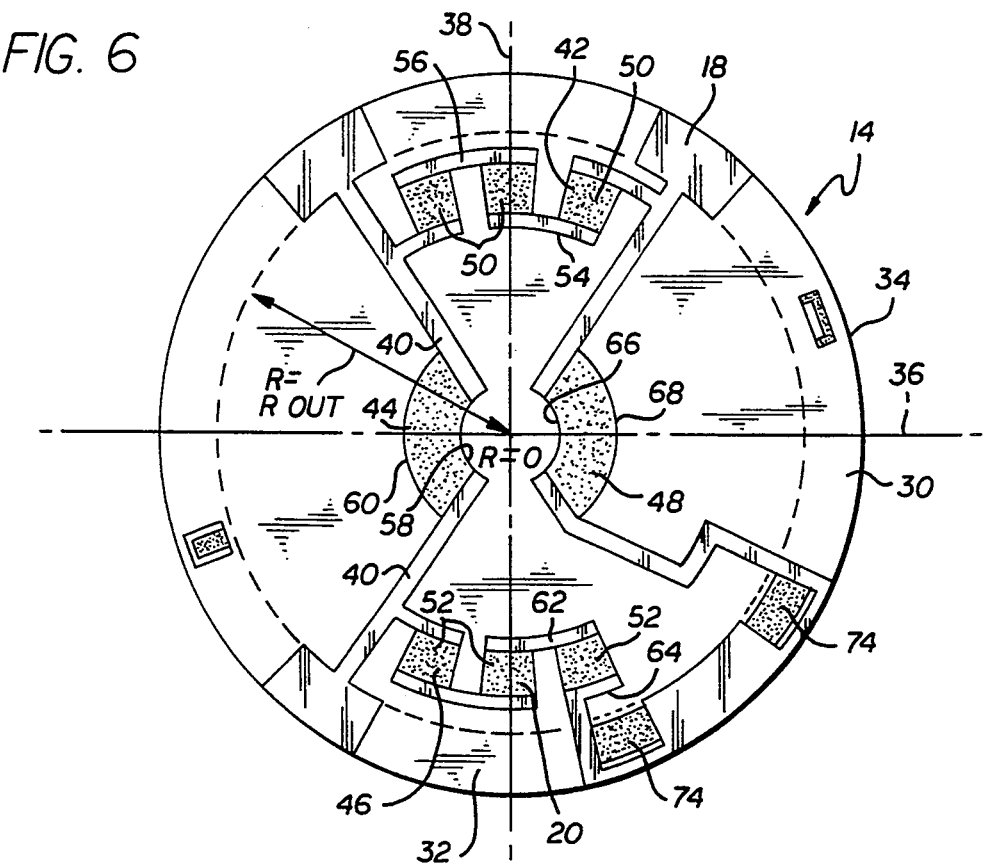
FIG. 6 is a top view of the resistive pressure transducer illustrating the present invention showing the conductive and resistive layer configurations.

Referring now to FIG. 6, a top view of the diaphragm upper surface 28, with the conductive layer 18 and resistive configuration 20 deposited on the upper surface 28 is shown. The diaphragm 14 is circular with an outer perimeter edge 34 defining an outer diameter dimension and a corresponding diaphragm radius. For purposes of reference, the diaphragm 14 further defines a horizontal axis 36 and a vertical axis 38.

The conductive layer 18 is deposited in a pre-determined path. In the preferred embodiment shown, the conductive layer includes four legs 40, each extending from approximately the outer perimeter edge 34 to approximately the center of the diaphragm 14.

In the preferred embodiment shown, the resistive configuration 20 is comprised of a first resistive pattern 42, a second resistive pattern 44, a third resistive pattern 46, and a fourth resistive pattern 48. The first resistive pattern 42 is deposited in close proximity to the outer perimeter edge 34, and is located such that it is bisected by the vertical axis 38. The second resistive pattern 44 is deposited in close proximity to the center of the diaphragm, and is located such that it is bisected by the diaphragm horizontal axis 36.

The third resistive pattern 46 is deposited in close proximity to the outer perimeter edge 34. The third resistive pattern 46 is preferably located such that it is a mirror image of the first resistive pattern 42 in reference to the horizontal axis 46, and therefore, is also bisected by the vertical axis 38. The fourth resistive pattern 48 is deposited in close proximity to the center of the diaphragm 14. The fourth resistive pattern 48 is preferably located such that it is a mirror image of the second resistive pattern 44 in reference to the vertical axis 38, and therefore, is also bisected by the horizontal axis 46.

The first resistive patterns 42 is preferably comprised of a plurality of interconnected resistors 50 spaced apart along the circumference of the diaphragm 14. In the embodiment shown, three resistors 50 are interconnected to form the first resistive pattern 42. The three resistors 50 are preferably substantially radially-extending, and interconnected by the conductive material 18. Preferably the conductive material 18 interconnects alternate successive ends of the resistors 50. Similarly, the third resistive pattern 46 is preferably formed of three substantially radially extending resistors 52, spaced apart along the periphery of the diaphragm 26 and interconnected by the conductive material 18. The use of the three separate resistors 50 and 52 interconnected by the conductive material enhances the radial effects on the first and third resistive patterns 42 and 46, and serves to minimize the tangential stress effects on the first and third resistive patterns 42 and 46.

The interconnection of the radially extending resistors 50 and 52 at alternate successive ends of the resistors by the conductive material 18 provides one feature of the present invention. The interconnecting conductive material 18 allows the resistors 50 and 52 of the first and third resistive patterns 42 and 46 to extend a maximum distance radially toward the center of the diaphragm 14, without allowing the positive tangential components present close to the center of the diaphragm 14 to cancel the negative tangential components present toward the outer edge of the diaphragm 14. Accordingly, these radially located resistive configurations 50 and 52 may have a net change in resistance which is opposite to that of the inner resistors 44 and 48. It should be noted that the plurality of present resistors 50 and 52 may also be interconnected by the conductive material 18 at the ends near the center of the diaphragm 14, and interconnected by resistive material at the ends near the outer perimeter of the diaphragm 14.

The first resistive pattern 42 is preferably curved and defines a first inner curved wall 54 and a first outer curved wall 56. Similarly, the third resistive pattern 46 also is preferably curved and defines a second inner curved wall 58 and a second outer curved wall 60. The radii of curvature of both the inner curved walls 54 and 58 and the outer curved walls 56 and 60 approximate the radius of curvature of the diaphragm outer edge 34.

The second and fourth resistive patterns 44 and 48 are also preferably curved. Therefore, the second resistive pattern defines a second inner curved wall 62 and a second outer curved wall 64, and the fourth resistive pattern defines a fourth inner curved wall 66 and a fourth outer curved wall 68. The radiuses of curvature for the inner curved walls 62 and 66 and the outer curved walls 64 and 68 also approximates the radius of curvature for the diaphragm outer edge 34.

Two resistors 74 are further deposited in close relation to the outer perimeter 30 of the diaphragm 14. In the preferred embodiment, the two resistors 74 are short-circuited, so as to have no effect on the pressure transducer 10. However, if necessary, the resistors 74 may be opened and used to balance the Wheatstone bridge of the pressure transducer 10.

By way of example, possible dimensions for the resistive configuration 20 in accordance with the present invention are given. It should be noted, however, that these dimensions are exemplary only of one embodiment of the invention. In this embodiment, the radius of the diaphragm is 0.350 inches. The radius of the first and third resistive pattern outer curved walls is 0.315 inches. The radius of the first and the third resistive pattern inner curved walls is 0.255 inches. The radius of the second and fourth resistive pattern outer curved walls is 0.128 inches. The radius of the second and fourth resistive pattern inner curved walls is 0.058 inches.

Figure 7:
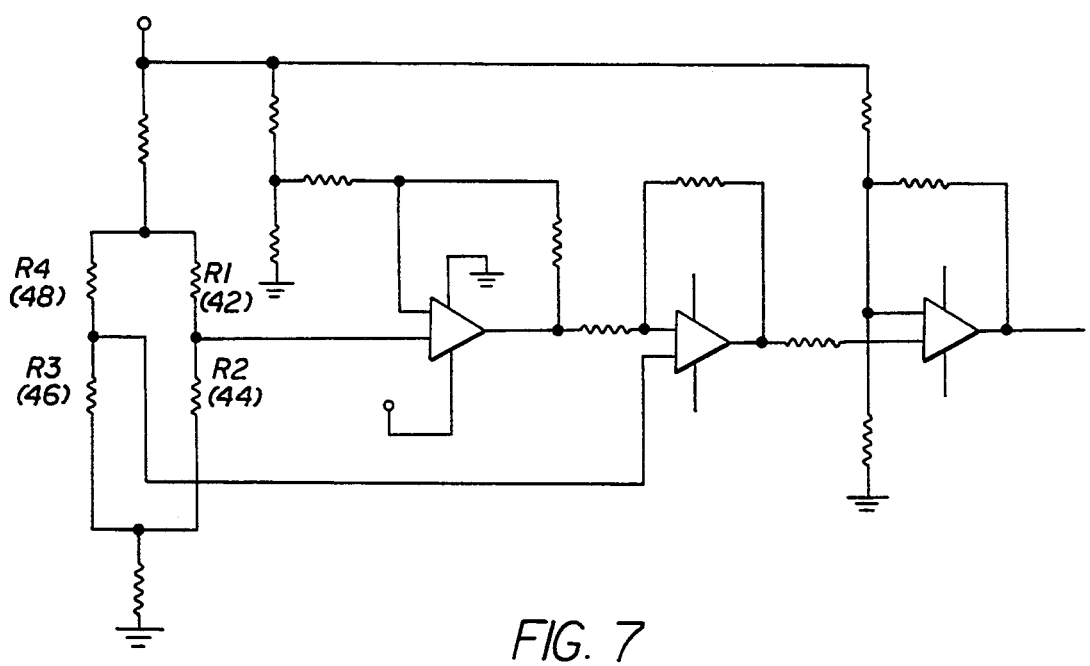
FIG. 7 is an electrical schematic diagram of a circuit for detecting resistive changes in the transducer of FIGS. 1, 2 and 6.

Referring now to FIG. 7, an electrical schematic for the resistive pressure transducer of the present invention is shown. Each of the four resistive patterns 42, 44, 46, and 48 form a leg of a Wheatstone Bridge configuration, such that the adjoining legs of the bridge sense strains of opposite signs, as explained more fully below.

It should be noted that the resistive pressure transducer 10 of the present invention functions with only the first resistive pattern 42 and third resistive pattern 46 deposited in the diaphragm 14 and coupled to sense the difference in resistance of the patterns 42 and 46 as the diaphragm 14 flexes under pressure. The advantage, however, of utilizing four resistive patterns, 42, 44, 46 and 48 coupled in a Wheatstone Bridge configuration is that the four resistive patterns provide automatic temperature compensation.

Figure 3:
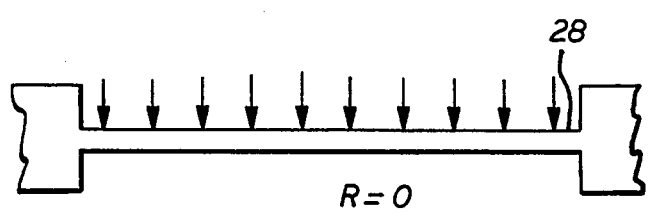
FIG. 3 is a diagrammatic view of the pressure media as applied across the surface of the resistive pressure transducer diaphragm.
Figure 4:
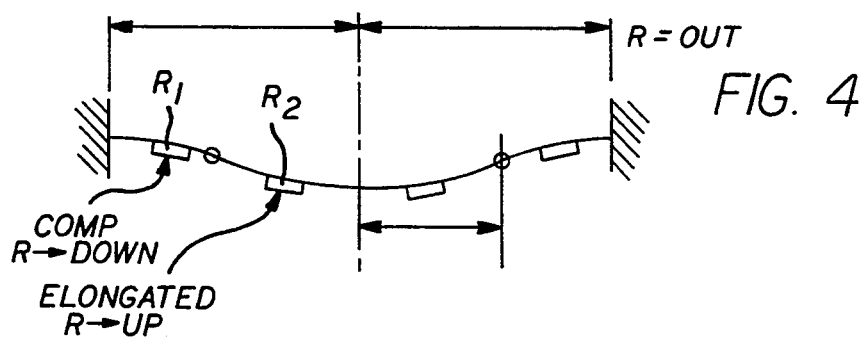
FIG. 4 is a graph showing the deflection in the resistive pressure transducer diaphragm as a result of the application of pressure as shown in FIG. 3.

Referring now to FIG. 3, a showing of pressure being applied to the diaphragm upper surface 28 is illustrated. The transducer 10 is oriented such that the pressure media is applied downward across the surface of diaphragm upper surface 28. FIG. 4 is a representational view of the deflection in the diaphragm caused by the pressure media. For the purposes of FIG. 4 it is assumed that the resistive patterns are on the lower surface of the diaphragm; however, the same result would be achieved with pressure applied to the lower surface of the diaphragm of FIG. 2, bowing the diaphragm upward. Returning to FIG. 4, when pressure is applied to the diaphragm upper surface 28, the resistive patterns near the center of the diaphragm are elongated, and therefore increase their value. The resistors near the diaphragm outer perimeter 30, however, are compressed, causing their value to decrease. For example, in testing performed on the preferred embodiment of the invention as shown in FIG. 6, the measured resistance of the first and third resistive patterns 42 and 46 decreased approximately five ohms (from 14,630 ohms to 14,626 ohms in the case of $R_1$, and from 14,464 to 14,458 in the case of $R_3$), as the pressure on the diaphragm upper surface increased from 1 PSI to 29 PSI. The measured resistance of the second and fourth resistive patterns 44 and 48 increased approximately forty-two ohms (from 12,715 ohms to 12,755 ohms for $R_2$ and from 13,290 ohms to 13,334 ohms for $R_4$) as the pressure on the diaphragm upper surface increased from 1 PSI to 29 PSI. Thus, one pair increased in resistance while the other pair decreased in resistance. In a similar test conducted on a prior art resistive pressure transducer using long, narrow resistive patterns, such as in FIG. 1 of U.S. Pat. No. 4,932,265 to Skuratovsky, the measured resistance of the resistive patterns located near the diaphragm outer perimeter increased approximately seven ohms, (from 10,559 ohms to 10,567 ohms for $R_1$ and from 10,362 ohms to 10,368 ohms for $R_3$) and the measured resistance of the resistive patterns located near the diaphragm center increased approximately thirty-two ohms, (from 17,476 ohms to 17,507 ohms for $R_2$ and from 10,466 ohms to 10,500 ohms for $R_4$) with both of these changes being increases in resistance. Therefore, the resistive configuration of the present invention allows for increased gain or sensitivity in the transducer as compared to the prior art pressure transducers using long, narrow resistors.

Figure 5:
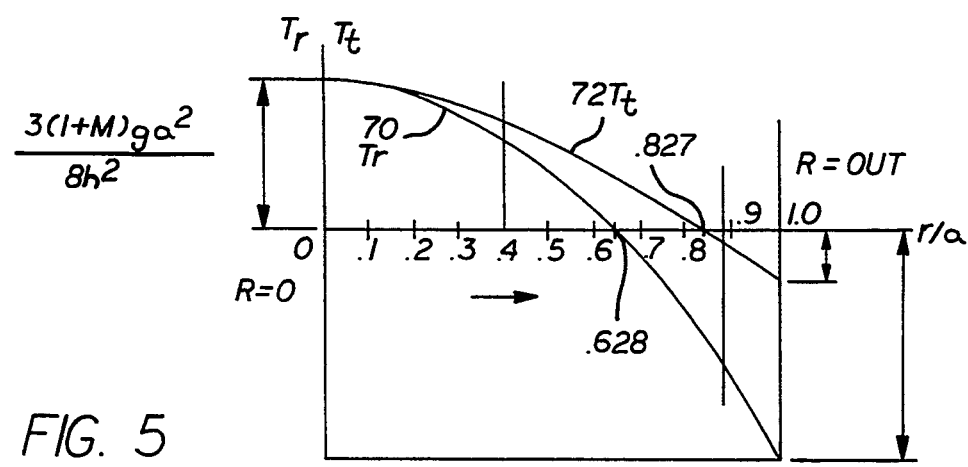
FIG. 5 is a plot of the radial and tangential stress component curves of the present invention against a dimensionless radius of the diaphragm.

Referring now to FIG. 5, a radial stress component curve 70 and a tangential stress component curve 72 for the present invention are shown. The stress curves 70 and 72 are graphs of the radial and tangential components of stress against the dimensionless radius r/a, wherein r=the radial dimension at which the resistor is located, and a=the diaphragm radius. The radial and tangential stress components, measured along the y-axis, are calculated by the following equation:

$$\frac{3(1+u)q\,a^2}{8\,h^2}$$

wherein u is equal to Poisson's ratio, q is equal to the distribution of load over the diaphragm surface, a is equal to the diaphragm radius, and h is equal to the thickness of the diaphragm.

The plot begins at r/a=0, the center of the diaphragm, shown on FIG. 4 as R=0, and extends to r/a=1, the outer edge of the diaphragm, shown on FIG. 4 at R=OUT. Still referring to FIG. 5, the radial stress component is maximum at r/a=0, the center of the diaphragm, and decreases to zero at the point where r/a=0.628. Above the point where r/a=0.628, the radial stress component is a negative value. Therefore the critical point for the radial stress curve 70 is the point where the ratio of the radial dimension of the resistor to the diaphragm radius is equal to 0.628. The tangential stress also is maximum at r/a=0 and decreases to zero at the point where r/a=0.827. Above r/a=0.827, the tangential stress component is a negative value. Therefore, the critical point for the tangential stress curve 72 is the point where the ratio of the radial dimension of the resistor to the diaphragm radius is equal to 0.827.

As previously explained herein, each of the resistive patterns of the present invention defines a measurable inner curved wall radius and a measurable curved wall outer radius. In order to maximize the performance of the pressure transducer, the ratio of the inner curved wall radius and the outer curved wall radius of the first and the third resisters to the diaphragm radius preferably correspond to a point on the radial stress component curve 70 wherein the radial stress component is a negative value. More specifically, the ratios of the radiuses of each of the first and the third resisters inner and outer curved walls to the diaphragm radius are preferably greater than 0.827, the critical point of the radial stress component curve 70. The radial location of the first and third resistive patterns as described above minimizes undesirable tangential effects picked up by the first and third resistive patterns.

Furthermore, the ratios of the radii of the inner wall and outer curved walls of the second and fourth resistive patterns to the diaphragm radius preferably correspond to a point on the tangential stress component curve 72 wherein the tangential stress component is a positive value. More specifically, the ratios of the inner curved wall and outer curved wall radii of the second and fourth resistive patterns to the diaphragm radius are preferably less than 0.628, the critical point of the tangential stress component curve 72. This radial location minimizes the undesirable radial effects picked up by the second and fourth resistive patterns.

For purposes of example, the exemplary dimensions of the embodiment of the present invention as previously described are used to demonstrate the preferred radial locations of the resistive patterns and the corresponding effect on the radial and tangential stress component curves. The ratio of the first and third resistor outer diameter to the radius is 0.315/0.350, which equals 0.9. The ratio of the first and third resistor inner diameter to the radius is 0.255/0.350, which equals 0.728. Referring to the radial stress component curve of FIG. 5, the points on the radial stress component curve corresponding to both 0.9 and 0.728 are higher than the radial stress component curve critical point of 0.628. Therefore, both 0.9 and 0.728 correspond to a negative value on the y-axis.

The ratio of the second and fourth resistor outer diameter to the diaphragm radius is therefore 0.128/0.350, which equals 0.36. The ratio of the second and fourth resistor inner diameter to the diaphragm radius is 0.058/0.350, which equals 0.165. Referring to the tangential stress component curve of FIG. 5, the points on the curve corresponding to 0.36 and 0.165 are both lower than the tangential stress curve critical point of 0.827. Therefore, both 0.36 and 0.165 correspond to a positive value on the y-axis.

Having thus described exemplary embodiments of the present invention, it should be noted by those skilled in the art that the within disclosures are exemplary only and that various other alternatives, adaptations and modifications may be made within the scope of the invention. Thus by way of example, but not of limitation, the resistive patterns may be deposited in different orientations with the effect of the radial dimensions of the resistive patterns still providing increased gain for the transducer. It is further noted that, with respect to the embodiment shown in FIG. 2, the opening through the substrate 12 may be wider than shown and may have a diameter equal to the inner diameter of the frit or other bonding material 16. Further, instead of being mounted to the substrate 12, the diaphragm 14 may be mounted between two peripheral 0-ring supports to mount diaphragm 12 and to seal and isolate gas or fluid pressure applied to two sides of the diaphragm 14. Ac- cordingly, it is to be understood that the present invention is not limited to the precise construction as shown in the drawings and described hereinabove.

What is claimed is:

1. A resistive configuration for measuring pressure, the configuration deposited on a surface of a diaphragm of substantially uniform thickness and having a path of conductive material, wherein the diaphragm is circular with an outer edge defining an outer diameter and a diaphragm radius, the resistive configuration comprising:
   a first resistive pattern deposited in close proximity to the outer edge of the diaphragm, wherein the first resistive pattern is comprised of a plurality of radially extending resistors spaced apart along the circumference of the diaphragm and interconnected by the conductive material;
   a second curved resistive pattern deposited in close proximity to the center of the diaphragm;
   a third resistive pattern deposited in close proximity to the outer edge of the diaphragm, wherein the third resistive pattern is comprised of a plurality of radially extending resistors spaced apart along the circumference of the diaphragm and interconnected by the conductive material; and
   a fourth curved resistive pattern deposited in close proximity to the center of the diaphragm;
   wherein the conductive material has a pre-determined resistivity and the first, second, third, and fourth resistive patterns have resistivities at least one hundred times greater than the pre-determined resistivity.

2. A resistive configuration in accordance with claim 1 wherein the second resistive pattern and fourth resistive pattern are curved and each are defined by an inner curved edge and an outer curved edge.

3. A resistive configuration in accordance with claim 1 wherein the second and fourth resistive patterns are substantially concentric with the diaphragm.

4. A pressure transducer as defined in claim 1 wherein circuit means are provided for interconnecting said resistive patterns in a Wheatstone Bridge configuration.

5. A resistive configuration in accordance with claim 1 wherein the first resistive pattern and the third resistive pattern each comprises three interconnected resistors.

6. A resistive configuration in accordance with claim 1 wherein the diaphragm defines a horizontal axis and a vertical axis, and further wherein the first resistive pattern and the third resistive patterns are substantially mirror images of each other in relation to the horizontal axis of the diaphragm.

7. A resistive configuration in accordance with claim 1 wherein said diaphragm defines a horizontal axis and a vertical axis, and further wherein the second resistive pattern and the fourth resistive patterns are substantially mirror images of each other in relation to the vertical axis of the diaphragm.

8. A resistive configuration in accordance with claim 1 wherein the critical point of the radial stress component occurs when the ratios of a measured radial dimension to the diaphragm radius equals 0.827, and further wherein the second and fourth resistive patterns are located on said diaphragm substantially inside a circle having said measured radial dimension.

9. A resistive configuration in accordance with claim 1 wherein the critical point of the tangential stress component occurs when the ratio of a measured radial dimension to the diaphragm radius equals 0.628, and further wherein the first and third resistive patterns outside a circle having said measured radial dimension.

10. A resistive pressure transducer for measuring pressure comprising:
    a flexible diaphragm, having a first surface, a second surface, and an outer edge defining an outer diameter and a radius;
    means for mounting said diaphragm to a support;
    a plurality of resistive patterns deposited on the first surface of the diaphragm, the resistive patterns further comprising a first resistive pattern deposited in close proximity to the outer edge of the diaphragm, the first resistive pattern including a plurality of substantially radially-extending resistive segments, with alternate ends of said resistive segments being interconnected by conductive material, and a second resistive pattern deposited in close proximity to the center of the diaphragm; and
    means for coupling said resistive patterns to sense the differences in resistance of said patterns as said diaphragm flexes;
    wherein the means for coupling has a pre-determined resistivity and the plurality of resistive patterns have resistivities at least one hundred times greater than the pre-determined resistivity.

11. A resistive pressure transducer in accordance with claim 10 wherein the second resistive pattern is curved and is defined by an inner curved edge and an outer curved edge.

12. A resistive pressure transducer in accordance with claim 10 wherein the first resistive pattern comprises three interconnected resistive segments.

13. A resistive pressure transducer in accordance with claim 10 wherein the critical point of the radial stress component occurs when the ratio of a measured radial dimension to the diaphragm radius equals 0.827, and further wherein the second resistive pattern is located on said diaphragm substantially inside a circle having said measured radial dimension.

14. A resistive pressure transducer in accordance with claim 10 wherein the critical point of the tangential stress component occurs when the ratio of a measured radial dimension to the diaphragm radius equals 0.628, and further wherein the first resistive pattern is located on said diaphragm substantially outside a circle having said measured radial dimension.

15. A resistive pressure transducer for measuring pressure, in accordance with claim 10 wherein said plurality of resistive patterns further includes a third resistive pattern deposited in close proximity to the outer edge of the diaphragm, the third resistive pattern including a plurality of substantially radially extending resistive segments, with alternate ends of successive segments being interconnected by conductive material, and a fourth curved resistive pattern deposited in close proximity to the center of the diaphragm.

16. A resistive pressure transducer for measuring pressure, in accordance with claim 15, wherein the fourth resistive pattern is curved and is defined by an inner curved edge and an outer curved edge.

17. A resistive pressure transducer for measuring pressure, in accordance with claim 15, wherein the third resistive pattern comprises three interconnected resistive segments.

18. A resistive pressure transducer in accordance with claim 15 wherein the critical point of the radial stress component occurs when the ration of a measured radial dimension to the diaphragm radius equals 0.827, and further wherein the fourth resistive pattern is located on said diaphragm substantially inside a circle having said measured radial dimension.

19. A resistive pressure transducer in accordance with claim 15 wherein the critical point of the tangential stress component occurs when the ratio of a measured radial dimension to the diaphragm radius equals 0.628, and further wherein the third resistive pattern is located on said diaphragm substantially outside a circle having said measured radial dimension.

20. A method of forming a resistive pressure transducer comprising the steps of:

providing a support member;

mounting a flexible diaphragm to said support around the periphery of said diaphragm wherein the diaphragm has a first surface and a second surface;

depositing a conductive material layer on the diaphragm first surface;

depositing a resistive configuration on the diaphragm first surface, wherein the step of depositing a resistive pattern further includes the steps of depositing a first curved resistance pattern in close proximity to the outer edge of the diaphragm, and wherein the first curved resistive pattern is comprised of a first plurality of substantially radially-extending resistors spaced apart along the periphery of the diaphragm;

interconnecting alternate ends of successive segments of the first plurality of resistors with the conductive material;

depositing a second curved resistive pattern in close proximity to the center of the diaphragm;

depositing a third curved resistive pattern in close proximity to the outer edge of the diaphragm and wherein the third curved resistive pattern is comprised of a third plurality of substantially radially-extending resistors spaced apart along the periphery of the diaphragm;

interconnecting alternate ends of successive segments of the third plurality of resistors with the conductive material;

depositing a fourth curved resistive pattern in close proximity to the center of the diaphragm; and coupling the four curved resistive patterns in a Wheatstone bridge configuration such that each resistive pattern forms a separate leg of the bridge;

wherein the conductive material has a pre-determined resistivity and each of the four resistive patterns has a resistivity at least one hundred times greater than the pre-determined resistivity.

21. A resistive pressure transducer for measuring pressure comprising:

a substrate having an upper surface and a lower surface;

a flexible diaphragm, having a first surface, a second surface, and an outer edge defining an outer diameter and a radius, wherein the diaphragm is mounted in a spaced apart relationship to the upper surface of the substrate;

a plurality of resistive patterns deposited on the first surface of the diaphragm, the resistive patterns further comprising a first resistive pattern deposited in close proximity to the outer edge of the diaphragm, the first resistive pattern including a plurality of substantially radially-extending resistive segments, with alternate ends of said resistive segments being interconnected by conductive material, and a second resistive pattern deposited in close proximity to the center of the diaphragm; and means for coupling said resistive patterns to sense the differences in resistance of said patterns as said diaphragm flexes;

wherein at least one resistive pattern comprises three interconnected resistive segments;

wherein the means for coupling has a pre-determined resistivity and the plurality of resistive patterns have resistivities at least one hundred times greater than the pre-determined resistivity.

22. A resistive pressure transducer in accordance with claim 21 wherein the first resistive pattern comprises three interconnected resistive segments.

23. A resistive pressure transducer in accordance with claim 21, wherein the third resistive pattern comprises three interconnected resistive segments.

* * * * *